(12) United States Patent
Kurtz et al.

(10) Patent No.: US 8,899,209 B2
(45) Date of Patent: Dec. 2, 2014

(54) SYSTEM AND METHOD FOR COMPENSATING CETANE

(75) Inventors: Eric Kurtz, Dearborn, MI (US); Douglas Kuhel, Wolverine Lake, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 331 days.

(21) Appl. No.: 13/401,501

(22) Filed: Feb. 21, 2012

(65) Prior Publication Data

US 2012/0145122 A1 Jun. 14, 2012

Related U.S. Application Data

(63) Continuation-in-part of application No. 13/291,852, filed on Nov. 8, 2011, now Pat. No. 8,267,065, which is a continuation of application No. 12/900,959, filed on Oct. 8, 2010, now Pat. No. 8,051,829.

(51) Int. Cl.
*F02D 41/38* (2006.01)
*F02D 41/40* (2006.01)
*F02D 41/00* (2006.01)
*F02B 37/16* (2006.01)
*F02D 35/02* (2006.01)
*F02B 37/18* (2006.01)

(52) U.S. Cl.
CPC .......... *F02D 41/402* (2013.01); *F02D 41/0025* (2013.01); *F02B 37/16* (2013.01); *F02D 35/028* (2013.01); *F02B 37/18* (2013.01); *Y02T 10/36* (2013.01); *Y02T 10/44* (2013.01)
USPC ...................................... 123/299; 123/406.47

(58) Field of Classification Search
CPC ......... F02D 41/38; F02D 41/40; F02D 41/45; F02D 35/028; F02D 41/402; F02D 41/403
USPC ................ 123/295, 299, 300, 304, 305, 575, 123/406.26, 406.47, 435; 701/103–105
See application file for complete search history.

(56) References Cited

U.S. PATENT DOCUMENTS 4,699,103 A 10/1987 Tsukahara et al.
4,886,026 A 12/1989 Cook (Continued)

FOREIGN PATENT DOCUMENTS

| EP | 0489493 A2 | 10/1991 |
| EP | 1001153 B1 | 11/1999 |
| JP | 2009281143 A | * 12/2009 |
| WO | 2009063298 A1 | 5/2009 |

OTHER PUBLICATIONS

Styron, Joshua Putman, "System and Method for Injecting Fuel," U.S. Appl. No. 13/401,536, filed Feb. 21, 2012, 46 pages.

(Continued)

*Primary Examiner* — Mahmoud Gimie
(74) *Attorney, Agent, or Firm* — Julia Voutyras; Alleman Hall McCoy Russell & Tuttle LLP

(57) ABSTRACT

Methods and systems for adjusting a plurality of fuel injections supplied to a cylinder during a cycle of the cylinder are described. In one example, fuel amounts are moved between fuel injections in response to combustion phase. Engine feedgas hydrocarbons and/or carbonaceous particulate matter may be reduced when cetane of combusted fuel changes.

7 Claims, 8 Drawing Sheets

(56) References Cited

U.S. PATENT DOCUMENTS

| | | |
|---|---|---|
| 5,438,967 A | 8/1995 | Ito |
| 5,676,118 A | 10/1997 | Saito |
| 5,740,775 A | 4/1998 | Suzuki et al. |
| 6,234,153 B1 | 5/2001 | DeGroot et al. |
| 6,367,452 B1 | 4/2002 | Shima et al. |
| 6,371,077 B1 | 4/2002 | McGee |
| 6,516,782 B1 | 2/2003 | Thomas |
| 6,725,829 B2 * | 4/2004 | Kataoka et al. ............... 123/299 |
| 6,742,492 B2 | 6/2004 | Kimura |
| 6,763,799 B2 | 7/2004 | Ito et al. |
| 6,994,077 B2 | 2/2006 | Kobayashi et al. |
| 7,234,440 B2 * | 6/2007 | Hilditch ........................ 123/305 |
| 7,284,506 B1 | 10/2007 | Sun et al. |
| 7,350,504 B2 | 4/2008 | Yasunaga et al. |
| 7,500,471 B2 | 3/2009 | Adachi et al. |
| 7,677,222 B2 | 3/2010 | Ishikawa |
| 7,681,554 B2 * | 3/2010 | Stein et al. .................... 123/478 |
| 7,848,871 B2 | 12/2010 | Onishi et al. |
| 7,849,842 B1 | 12/2010 | Lewis et al. |
| 8,051,829 B2 | 11/2011 | Kurtz et al. |
| 2002/0139111 A1 | 10/2002 | Ueda et al. |
| 2003/0230276 A1 * | 12/2003 | Kataoka et al. ............... 123/295 |
| 2007/0235009 A1 | 10/2007 | Nakashima et al. |
| 2007/0245818 A1 * | 10/2007 | Matekunas et al. .......... 73/118.1 |
| 2008/0103678 A1 | 5/2008 | Teraji et al. |
| 2009/0292447 A1 * | 11/2009 | Yamaguchi et al. .......... 701/103 |
| 2010/0089366 A1 * | 4/2010 | Tanaka .......................... 123/447 |
| 2010/0228463 A1 * | 9/2010 | Kweon et al. .................. 701/103 |

OTHER PUBLICATIONS

Mariucci, Vincent Edward, "Method and System for Reducing Soot Formed by an Engine," U.S. Appl. No. 13/314,081, filed Dec. 7, 2011, 37 pages.

* cited by examiner

SYSTEM AND METHOD FOR COMPENSATING CETANE

CROSS REFERENCE TO RELATED APPLICATIONS

The present application is a continuation-in-part of U.S. patent application Ser. No. 13/291,852, entitled "METHOD FOR CONTROLLING LOW TEMPERATURE COMBUSTION," filed Nov. 8, 2011, which is a continuation of U.S. patent application Ser. No. 12/900,959, entitled "METHOD FOR CONTROLLING LOW TEMPERATURE COMBUSTION," filed Oct. 8, 2010, which is now U.S. Pat. No. 8,051,829, the entire disclosures of which are hereby incorporated by reference for all purposes.

BACKGROUND/SUMMARY

Diesel fuel may be delivered to customers with different properties at different times of the year. For example, additives may be mixed with diesel fuel to improve combustion during cold or warm weather. Further, different fuel refiners may process diesel fuel in slightly different ways so that diesel fuel properties may vary slightly from distributor to distributor. One property that may vary from season to season and distributor to distributor is a cetane number of the diesel fuel. A diesel fuel with a higher cetane number may advance phase of combustion (e.g., time of ignition relative to crankshaft position) in an engine while diesel fuel with a lower cetane number may retard phase of combustion in the engine. Changes in combustion phase can increase engine emissions such as HC, CO, NOx, fuel consumption, combustion noise, and/or carbonaceous particulate matter. Therefore, it may be desirable to compensate for fuels having cetane numbers that vary from fuels that have nominal cetane numbers. It may be possible to compensate for fuels having different cetane numbers by adjusting start of injection timing; however, simply adjusting start of injection timing can increase engine hydrocarbon emissions and particulate matter.

The inventors herein have recognized the above-mentioned disadvantages and have developed a method for operating an engine, comprising: combusting a first fuel in a cylinder, the first fuel mixture ignited via compression ignition; combusting a second fuel in the cylinder, a combustion phase of the cylinder advanced when the first fuel is combusted compared to when the second fuel is combusted; and adjusting a number of fuel injections provided to the cylinder during a cycle of the cylinder in response to the combustion phase.

By changing a number of injections delivered to a cylinder during a cycle of the cylinder or the relative amounts of fuel in each injection, it may be possible to compensate for changes in cetane that affect combustion phase of a cylinder. For example, during combustion of a nominal cetane fuel, three injections of fuel may provide desirable amounts of cylinder emissions and combustion noise. However, if a fuel is combusted in the cylinder that has a lower cetane than the nominal cetane fuel, the number of fuel injections provided to the cylinder during a cycle of the cylinder may be adjusted (e.g., increased) to compensate for a change in ignition dwell time that is related to combusting fuel with a lower cetane number. In other examples, fuel amounts may be exchanged between fuel pulses that are delivered to a cylinder to compensate for a change in fuel cetane.

The present description may provide several advantages. Specifically, the approach may reduce engine emissions when fuels having different cetane numbers are combusted by the engine. In addition, the approach may also be useful to reduce engine noise by controlling the rate of heat release during a cycle of the cylinder. Further, the approach may account for limitations of fuel injectors when fuel amounts are exchanged between different fuel pulses delivered to an engine cylinder.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
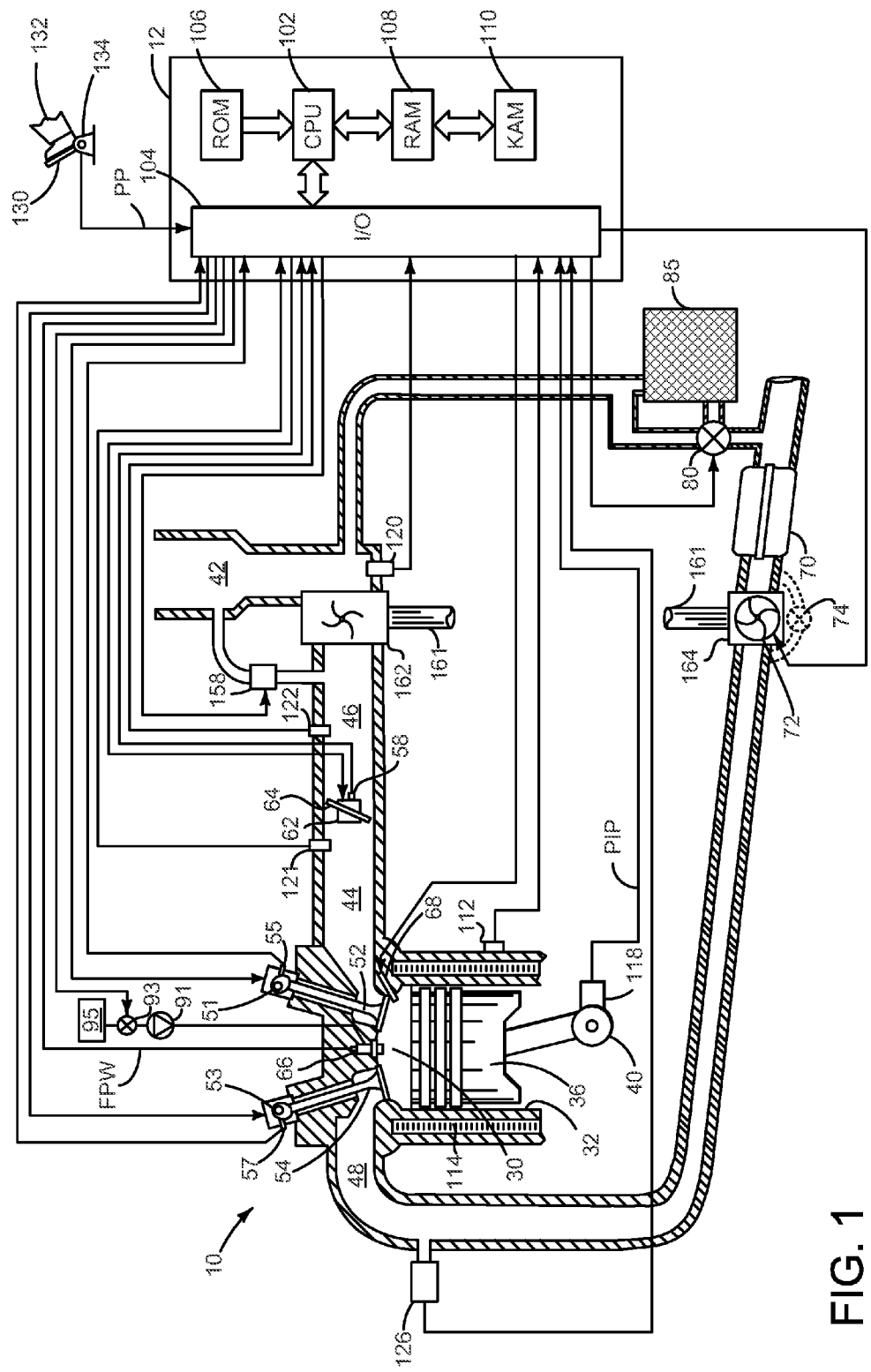
FIG. 1 shows a schematic depiction of an engine.

The present description is related to compensating combusting for fuels that have different cetane numbers. FIG. 1 shows one example of a boosted diesel engine where the method of FIGS. 7-8 may adjust fuel injection to improve engine emissions and/or reduce combustion noise. FIGS. 2-6 show an example simulated fuel injection timings to compensate for combusting fuels that have different cetane numbers.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Fuel injector 66 delivers fuel in proportion to the pulse width of signal FPW from controller 12. Fuel is delivered to fuel injector 66 by a fuel system including a fuel tank 95, fuel pump 91, fuel pump control valve 93, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. In some examples, a charge air cooler may be provided. Compressor speed may be adjusted via adjusting a position of variable vane control 72 or compressor bypass valve 158. In alternative examples, a waste gate 74 may replace or be used in addition to variable vane control 72. Variable vane control 72 adjusts a position of variable geometry turbine vanes. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 74 allows exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce the possibility of compressor surge.

Combustion is initiated in combustion chamber 30 when fuel automatically ignites as piston 36 approaches top-dead-center compression stroke. In some examples, a universal Exhaust Gas Oxygen (UEGO) sensor 126 may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures glow plug 68 may convert electrical energy into thermal energy so as to raise a temperature in combustion chamber 30. By raising temperature of combustion chamber 30, it may be easier to ignite a cylinder air-fuel mixture via compression.

Emissions device 70 can include a particulate filter and catalyst bricks, in one example. In another example, multiple emission control devices, each with multiple bricks, can be used. Emissions device 70 can include an oxidation catalyst in one example. In other examples, the emissions device may include a lean NOx trap or a selective catalyst reduction (SCR), and/or a diesel particulate filter (DPF).

Exhaust gas recirculation (EGR) may be provided to the engine via EGR valve 80. EGR valve 80 is a three-way valve that closes or allows exhaust gas to flow from downstream of emissions device 70 to a location in the engine air intake system upstream of compressor 162. In alternative examples, EGR may flow from upstream of turbine 164 to intake manifold 44. EGR may bypass EGR cooler 85, or alternatively, EGR may be cooled via passing through EGR cooler 85. In other, examples high pressure and low pressure EGR system may be provided.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 121 coupled to intake manifold 44; boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Thus, the system of FIG. 1 provides for an engine system, comprising: a compression ignition engine including a combustion chamber; a fuel injector directly injecting fuel into the combustion chamber; and a control system including a computer program stored in a non-transitory medium including executable instructions to adjust fuel amounts between a plurality of fuel injections delivered to a cylinder during a cycle of the cylinder in response to a combustion phase of the cylinder, and instructions to adjust a fuel injection amount of a first fuel injection when a fuel injection amount of a second fuel injection reaches a minimum pulse width of a fuel injector providing the plurality of fuel injections, the first fuel injection and the second fuel injection included in the plurality of fuel injections. In this way, the system can account for minimum fuel injector pulse width when a plurality of fuel injections are provided to a cylinder during a cycle of the cylinder.

The engine system includes where the adjusting of fuel amounts between the plurality of fuel injections comprises reducing an early fuel injection event by a first fuel amount and adding the first fuel amount to a late fuel injection event. The engine system also includes where adjusting the fuel injection amount of the first fuel injection includes increasing a fuel amount of the first fuel injection, and further comprising additional executable instructions to cease providing the second fuel injection after a pulse width of the fuel injector reaches the minimum pulse width. In some examples, the engine system includes where fuel amounts between the plurality of fuel injections are adjusted over a plurality of cycles of the cylinder. The engine system further comprises additional executable instructions to adjust a number of fuel injections supplied to the cylinder in response to the combustion phase.

Figure 2:
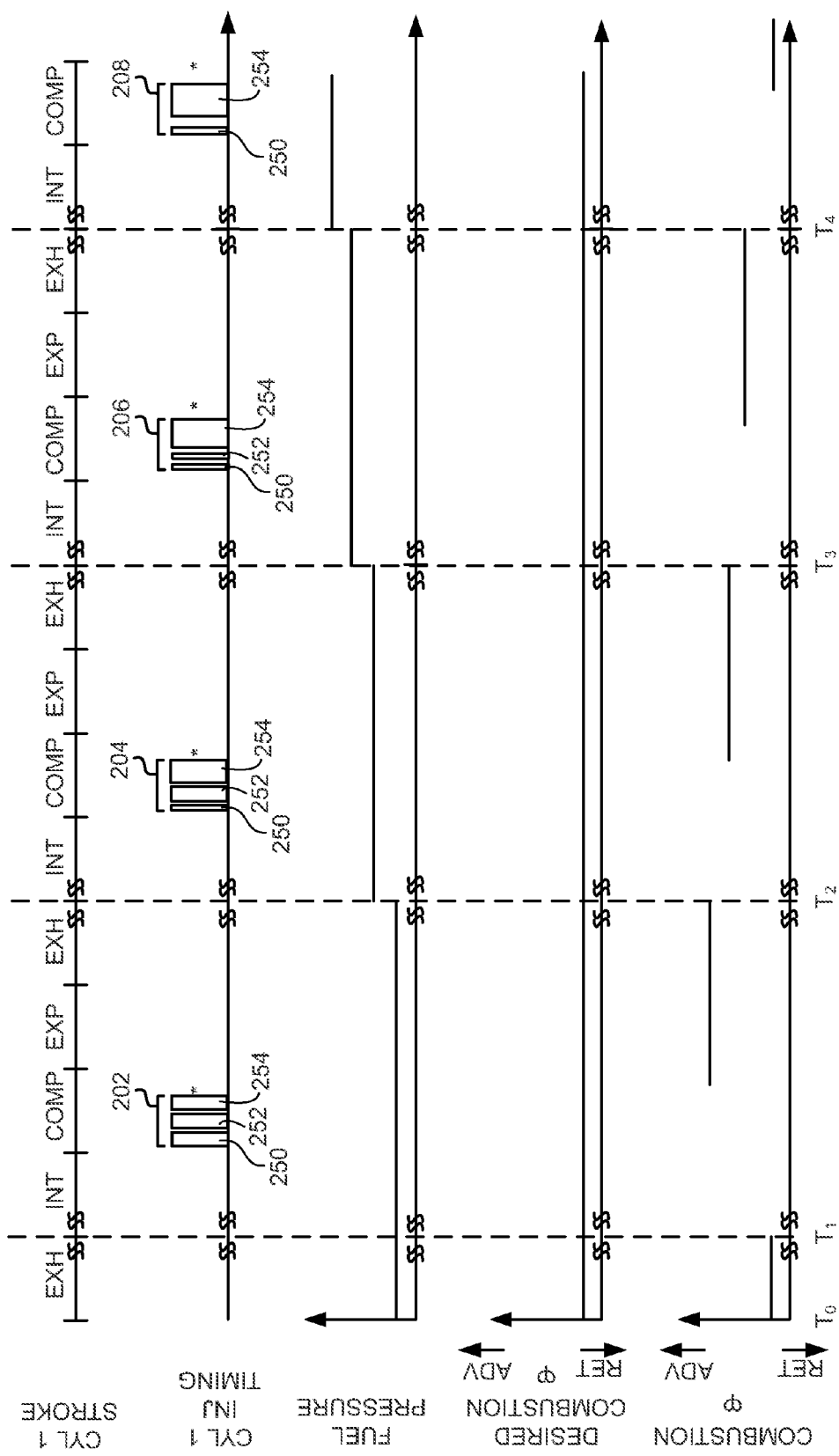
FIGS. 2-6 show signals of interest during conditions where combustion phase of a cylinder changes in response to cetane of fuel combusted in the cylinder.

Referring now to FIG. 2, signals of interest during a time when combustion phase of a cylinder advances and is then retarded are shown. The signals and sequences of FIG. 2 may be provided by the system shown in FIG. 1 executing the method of FIGS. 7 and 8. An engine is operated at substantially the same speed and torque demand for all cylinder cycles shown so that fuel adjustments and effects of the fuel adjustments may be illustrated under similar conditions. Further, the fuel timing and amounts are merely for illustrative purposes and are not intended to limit the scope or breadth of the description.

The first plot from the top of FIG. 2 represents cylinder stroke of one cylinder of an engine. The X axis is broken into a series of segments that identify the cylinder stroke that cylinder number one is on as time proceeds from the left side of the figure to the right side of the figure. Exhaust stroke is abbreviated EXH while intake, compression, and expansion strokes are abbreviated by INT, COMP, and EXP respectively. Between vertical time markers $T_1$-$T_4$, breaks in time are indicated via SS markers along the X axis. The breaks in time may be over several cylinder cycles or over an extended period of time. Thus, FIG. 2 shows a progression over time or cylinder cycles of changing signals.

The second plot from the top of FIG. 2 represents fuel injection timing during a cylinder cycle. The pulse widths 250-254 vary in width and the width is an indication of an amount of fuel injected in the pulse. The wider the pulse is the larger the amount of fuel that is injected into the cylinder during the pulse. The * symbols represent the location of ignition in the cylinder. It should be noted that when ignition occurs prior to the end of the last fuel injection, an increase in particulate matter may occur since the injected fuel has less time to mix in the cylinder.

The third plot from the top of FIG. 2 represents fuel pressure of fuel that is injected to a cylinder at the timings shown. The Y axis represents fuel pressure and fuel pressure increases in a direction of the Y axis arrow. The X axis represents time and time increases from the left to the right side of the figure.

The fourth plot from the top of FIG. 2 represents the desired combustion phase of cylinder number one. Combustion phase advances in the direction of the ADV arrow along the Y axis. Combustion phase retards in the direction of the RET arrow along the X axis. The X axis represents time and time increases from the left to the right side of the figure.

The fifth figure from the top of FIG. 2 represents the actual combustion phase of cylinder number one. Combustion phase advances in the direction of the ADV arrow along the Y axis. Combustion phase retards in the direction of the RET arrow along the X axis. The X axis represents time and time increases from the left to the right side of the figure.

At the time between $T_0$ and $T_1$, the desired combustion phase of cylinder number one is toward the retarded range, and the actual combustion phase substantially matches the desired combustion phase. The fuel pressure is also at a lower level. The fuel injection pulses, although not shown, are as shown at the timings between times $T_1$ and $T_2$ and the fuel cetane number is a nominal cetane number, 45 for example.

At the time between $T_1$ and $T_2$, the desired combustion phase remains at the same level as is shown at time $T_0$. Three fuel injections 250-254 are injected during the compression stroke of cylinder number one. The amount of fuel in each of the three fuel injections 250-254 is substantially equivalent. It should also be noted that the fuel injection amounts and pressures between time $T_1$ and $T_2$ are the same as before time $T_1$. The duration of the fuel injection time is denoted at 202. The fuel pressure is also at a relatively low value. Combustion occurs shortly after the third fuel pulse 254 as indicated by the *. The actual combustion phase is advanced as compared to the actual combustion phase before time $T_1$. In this example, the combustion phase is advanced due to a cetane number of a combusted fuel changing from time $T_0$ to time $T_1$. In this example, the cetane number is increased as compared to fuel having a nominal cetane number. The fuel cetane number may increase when the vehicle in which the engine operates is refilled with fuel. Thus, the increased cetane number of the fuel advances the actual combustion phase away from the desired combustion phase.

Between time $T_2$ and $T_3$, the fuel injection timing is adjusted and the fuel injection pressure is increased. Specifically, a portion of the amount of fuel in the early or first fuel pulse 250 is transferred to the late or third fuel pulse 254. In this way, the duration of pulse 254 increases and the duration of pulse 250 decreases. Removing an amount of fuel from the early injection and adding the same amount of fuel that was removed from the early injection to the last injection can retard combustion in the cylinder even with for the fuel with the higher cetane number. FIG. 2 also shows that the start of injection time is maintained for fuel pulse 250. Further, the amount of fuel injected in the duration 204 is the same as at the duration 202. Additionally, the duration of time in which the fuel injections may be substantially maintained to provide the same ignition dwell (e.g., time from end of last fuel injection to ignition) at before time $T_1$. The fuel injection pressure is also increased so that mixing of fuel with air in the cylinder is improved for the late fuel injection pulse 254. It can be seen that the actual combustion phase between time $T_2$ and time $T_3$ is retarded in response to the fuel pulse adjustment and moves toward the desired combustion phase.

Between time $T_3$ and $T_4$, the fuel injection timing is further adjusted and the fuel injection pressure is increased. Specifically, the fuel pulse width of the first fuel pulse 250 reaches a minimum pulse width (e.g., the shortest fuel pulse where the amount of fuel injected is repeatable to a desirable extent) as fuel is moved from the early fuel pulse 250 to the late fuel pulse 254. Fuel is then transferred from the middle fuel pulse 252 to the late fuel pulse 254 in order to further retard combustion phase. Removing an amount of fuel from the middle injection and adding the same amount of fuel that was removed from the middle injection to the last injection also acts to retard combustion in the cylinder for the fuel with the higher cetane number. The start of injection time is also maintained for fuel pulse 250. Further, the amount of fuel injected in the duration 206 is the same as at the duration 202. Additionally, the duration of time in which the fuel injections may be substantially maintained to provide the same ignition dwell at before time $T_1$. The actual combustion phase and the * are shown being further retarded. The fuel injection pressure is also increased so that mixing of fuel with air in the cylinder is improved for the late fuel injection pulse 254. It can be seen that the combustion phase between time $T_3$ and time $T_4$ is further retarded in response to the fuel pulse adjustment.

After time $T_4$, the fuel injection timing is further adjusted and the fuel injection pressure is increased. Specifically, the middle fuel pulse width is eliminated after the second fuel pulse 252 reaches a minimum pulse width (e.g., the shortest fuel pulse where the amount of fuel injected is repeatable to a desirable extent) and further combustion phase retard is desired. A portion of the fuel eliminated from middle fuel pulse 252 is moved to the early fuel pulse 250, and the remaining amount of fuel from the middle fuel pulse 252 is transferred to the late fuel pulse 254. The actual combustion phase and the * are shown being further retarded. If additional combustion phase retard is desirable to match the actual combustion phase to the desired combustion phase, fuel in the early fuel pulse can be transferred to the late fuel pulse 254. All fuel remaining in the early fuel pulse 250 may be transferred to the late fuel pulse 254 when the early fuel pulse 250 reaches a minimum fuel injector pulse width and additional combustion phase retard is desired. The amount of fuel injected in the duration 208 is the same as at the duration 202.

In this way, fuel amounts between a plurality of fuel injections provided to a cylinder during a cylinder cycle may be adjusted over a number of combustion events to retard combustion phase of a cylinder when combustion phase of the cylinder is advanced farther than is desired. Further, the start of injection time is maintained for fuel injection pulse 250 during each of the cylinder cycles shown between $T_1$ and $T_4$. Further still, fuel injection pressure may be increased to improve air-fuel mixing in the cylinder so that particulate matter may be reduced when the combustion phase is retarded.

The sequences of FIGS. 3-6 show the same signals as are described in FIG. 2. Therefore, for the sake of brevity, signals and portion of the sequence that are common between the figures is not repeated.

Figure 3:
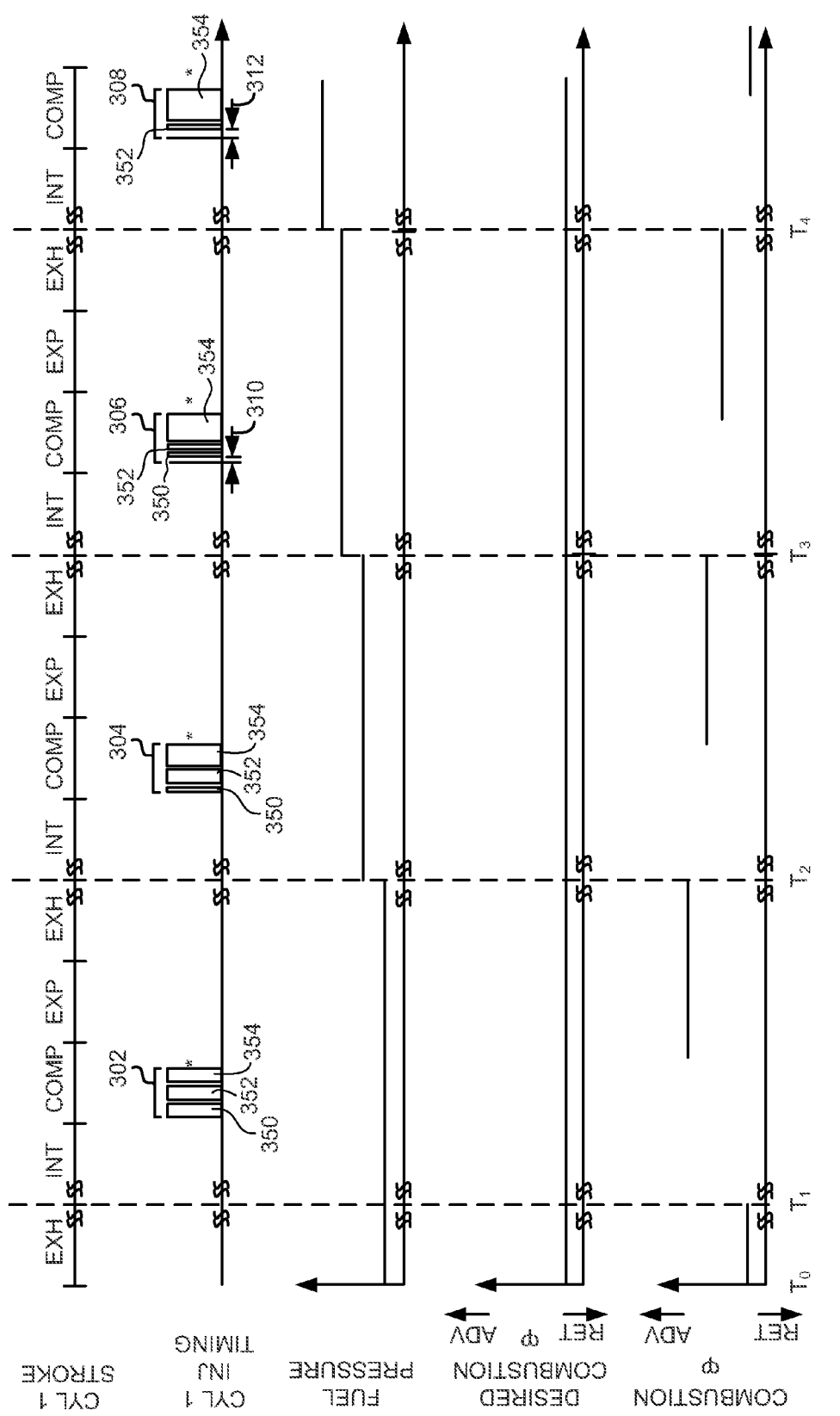

Referring now to FIG. 3, signals of interest during a time when combustion phase of a cylinder advances and is then retarded are shown. The signals and sequences of FIG. 3 may be provided by the system shown in FIG. 1 executing the method of FIGS. 7 and 8. An engine is operated at substantially the same speed and torque demand for all cylinder cycles shown so that fuel adjustments and effects of the fuel adjustments may be illustrated under similar conditions.

At the time between $T_0$ and $T_1$, the desired combustion phase of cylinder number one is toward the retarded range, and the actual combustion phase substantially matches the desired combustion phase. The fuel pressure is also at a lower level. The fuel injection pulses, although not shown, are as shown at the timings between times $T_1$ and $T_2$ and the fuel cetane number is a nominal cetane number.

At the time between $T_1$ and $T_2$, the desired combustion phase remains at the same level as is shown at time $T_0$. Three fuel injections 350-354 are injected during the compression stroke of cylinder number one. The amount of fuel in each of the three fuel injections 350-354 is substantially equivalent. It should also be noted that the fuel injection amounts and pressures between time $T_1$ and $T_2$ are the same as before time $T_1$. The duration of the fuel injection time is denoted at 302. The fuel pressure is also at a relatively low value. Combustion occurs shortly after the third fuel pulse 354 as indicated by the *. The actual combustion phase is advanced as compared to the actual combustion phase before time $T_1$. In this example, the combustion phase is also advanced due to a cetane number of a combusted fuel changing from time $T_0$ to time $T_1$. Thus, the increased cetane number of the fuel advances the actual combustion phase away from the desired combustion phase.

Between time $T_2$ and $T_3$, the fuel injection timing is adjusted and the fuel injection pressure is increased. Specifically, a portion of the amount of fuel in the early or first fuel pulse 350 is transferred to the late or third fuel pulse 354. Again, removing an amount of fuel from the early injection and adding the same amount of fuel that was removed from the early injection to the last injection can retard combustion in the cylinder even with for the fuel with the higher cetane number. Further, the amount of fuel injected in the duration 304 is the same as at the duration 302. The fuel injection pressure is also increased so that mixing of fuel with air in the cylinder is improved for the late fuel injection pulse 354. It can be seen that the actual combustion phase between time $T_2$ and time $T_3$ is retarded in response to the fuel pulse adjustment and moves toward the desired combustion phase.

Between time $T_3$ and $T_4$, the fuel injection timing is further adjusted and the fuel injection pressure is increased. Specifically, the fuel pulse width of the first fuel pulse 350 reaches a minimum pulse width as fuel is moved from the early fuel pulse 350 to the late fuel pulse 354. Fuel is also transferred from the middle fuel pulse 352 to the late fuel pulse 354 in order to further retard combustion phase of the cylinder. Removing an amount of fuel from the middle injection and adding the same amount of fuel that was removed from the middle injection to the last injection also acts to retard combustion in the cylinder for the fuel with the higher cetane number. The start of injection time may also be retarded for the early and middle fuel injections in some examples as shown at 310. Further, the amount of fuel injected in the duration 306 is the same as at the duration 302. The actual combustion phase and the * are shown being further retarded. The fuel injection pressure is also increased. It can be seen that the combustion phase between time $T_3$ and time $T_4$ is further retarded in response to the fuel pulse adjustment.

After time $T_4$, the fuel injection timing is further adjusted and the fuel injection pressure is increased. Specifically, the early fuel pulse width is eliminated after the second fuel pulse 352 reaches a minimum pulse width and further combustion phase retard is desired. A portion of the fuel eliminated from early fuel pulse 350 is moved to the middle fuel pulse 352, and the remaining amount of fuel from the early fuel pulse 350 is transferred to the late fuel pulse 354. The actual combustion phase and the * are shown being further retarded. If additional combustion phase retard is desirable to match the actual combustion phase to the desired combustion phase, fuel in the middle fuel pulse can be transferred to the late fuel pulse 354. The start of injection timing is retarded by eliminating the early or most advanced pulse width. The additional amount of SOI retard is indicated at 312. All fuel remaining in the middle fuel pulse 352 may be transferred to the late fuel pulse 354 when the middle fuel pulse 352 reaches a minimum fuel injector pulse width and additional combustion phase retard is desired. The amount of fuel injected in the duration 308 is the same as at the duration 302.

In this way, fuel amounts between a plurality of fuel injections provided to a cylinder during a cylinder cycle may be adjusted over a number of combustion events to retard combustion phase of a cylinder when combustion phase of the cylinder is advanced farther than is desired. Further, the start of injection time is retarded for early and middle fuel injections. Additionally, fuel injection pressure may be increased to improve air-fuel mixing in the cylinder so that particulate matter may be reduced when the combustion phase is retarded.

Figure 4:
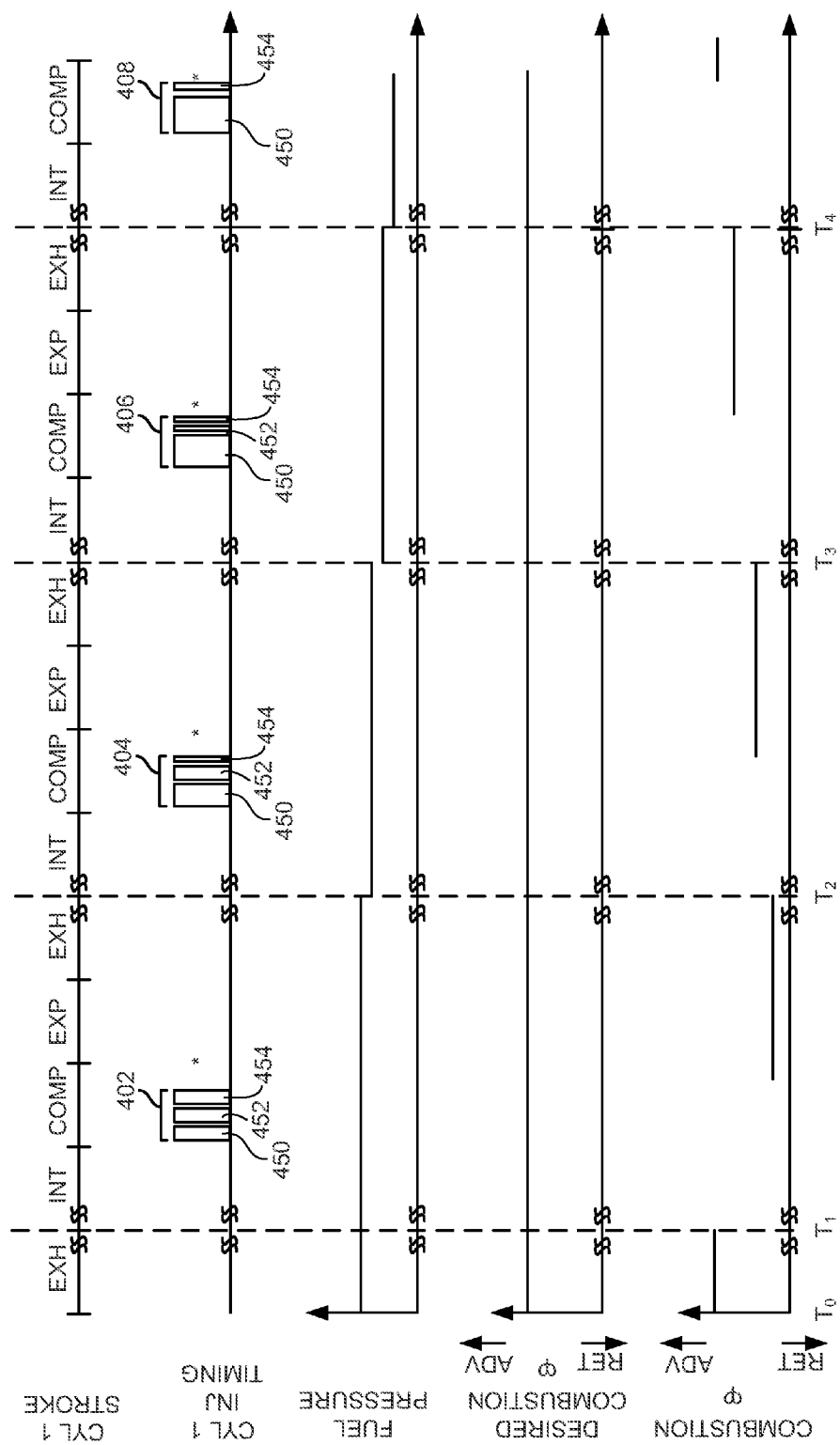

Referring now to FIG. 4, signals of interest during a time when combustion phase of a cylinder is retarded and is then advanced are shown. The signals and sequences of FIG. 4 may be provided by the system shown in FIG. 1 executing the method of FIGS. 7 and 8. An engine is operated at substantially the same speed and torque demand for all cylinder cycles shown so that fuel adjustments and effects of the fuel adjustments may be illustrated under similar conditions.

At the time between $T_0$ and $T_1$, the desired combustion phase of cylinder number one is toward the advanced range, and the actual combustion phase substantially matches the desired combustion phase. The fuel pressure is also at a higher level. The fuel injection pulses, although not shown, are as shown at the timings between times $T_1$ and $T_2$ and the fuel cetane number is a nominal cetane number.

At the time between $T_1$ and $T_2$, the desired combustion phase remains at the same level as is shown at time $T_0$. Three fuel injections 450-454 are injected during the compression stroke of cylinder number one. The amount of fuel in each of the three fuel injections 450-454 is substantially equivalent. The duration of the fuel injection time is denoted at 402. The fuel pressure is also at a relatively high value. Combustion occurs delayed after the third fuel pulse 454 as indicated by the *. The actual combustion phase is retarded as compared to the actual combustion phase before time $T_1$. In this example, the combustion phase is also retarded due to a cetane number of a combusted fuel changing from time $T_0$ to time $T_1$. Thus, the decreased cetane number of the fuel retards the actual combustion phase away from the desired combustion phase.

Between time $T_2$ and $T_3$, the fuel injection timing is adjusted and the fuel injection pressure is decreased. Specifically, a portion of the amount of fuel in the late or third fuel pulse 454 is transferred to the early or first fuel pulse 450. Further, the end of fuel injection time remains constant. Removing an amount of fuel from the late injection and adding the same amount of fuel that was removed from the late injection to the first injection can advance combustion in the cylinder even with for the fuel with the lower cetane number. Further, the amount of fuel injected in the duration 404 is the same as at the duration 402. The fuel injection pressure is also decreased since less fuel mixing may be desired when less fuel is injected late in the cylinder cycle. It can be seen that the actual combustion phase between time $T_2$ and time $T_3$ is advanced in response to the fuel pulse adjustment and moves toward the desired combustion phase.

Between time $T_3$ and $T_4$, the fuel injection timing is further adjusted and the fuel injection pressure is decreased. Specifically, the fuel pulse width of the late fuel pulse 454 reaches a minimum pulse width as fuel is moved from the late fuel pulse 455 to the early fuel pulse 450. Fuel is also transferred from the middle fuel pulse 452 to the early fuel pulse 450 in order to further advance combustion phase of the cylinder. Removing an amount of fuel from the middle injection and adding the same amount of fuel that was removed from the middle injection to the early injection also acts to advance combustion in the cylinder for the fuel with the lower cetane number. Further, the amount of fuel injected in the duration 406 is the same as at the duration 402. The actual combustion phase and the * are shown being further advanced. The fuel injection pressure is also decreased. It can be seen that the combustion phase between time $T_3$ and time $T_4$ is further advanced in response to the fuel pulse adjustment.

After time $T_4$, the fuel injection timing is further adjusted and the fuel injection pressure is decreased. Specifically, the middle fuel pulse width 452 is eliminated after the middle fuel pulse 452 reaches a minimum pulse width and further combustion phase advance is desired. A portion of the fuel eliminated from middle fuel pulse 452 is moved to the late fuel pulse 454, and the remaining amount of fuel from the middle fuel pulse 452 is transferred to the early fuel pulse 450. The actual combustion phase and the * are shown being further advanced. If additional combustion phase advance is desirable to match the actual combustion phase to the desired combustion phase, fuel in the late fuel pulse 454 can be transferred to the early fuel pulse 450. The end of injection timing is maintained by eliminating the middle pulse width. All fuel remaining in the late fuel pulse 454 may be transferred to the early fuel pulse 450 when the late fuel pulse 454 reaches a minimum fuel injector pulse width and additional combustion phase advance is desired. The amount of fuel injected in the duration 408 is the same as at the duration 402.

In this way, fuel amounts between a plurality of fuel injections provided to a cylinder during a cylinder cycle may be adjusted over a number of combustion events to advance combustion phase of a cylinder when combustion phase of the cylinder is retarded farther than is desired. Additionally, fuel injection pressure may be decreased to improve engine efficiency.

Figure 5:
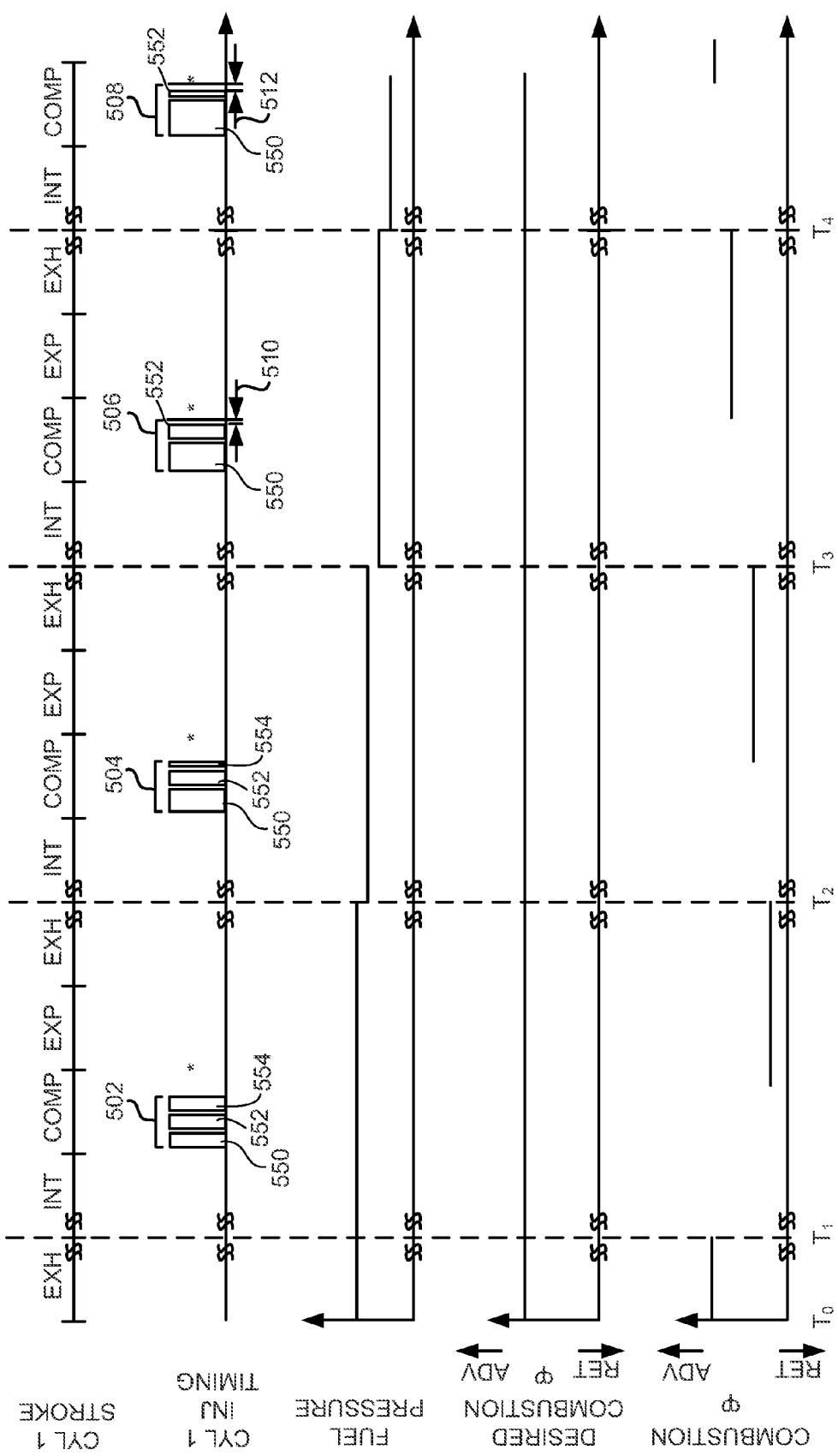

Referring now to FIG. 5, signals of interest during a time when combustion phase of a cylinder is retarded and is then advanced are shown. The signals and sequences of FIG. 5 may be provided by the system shown in FIG. 1 executing the method of FIGS. 7 and 8. An engine is operated at substantially the same speed and torque demand for all cylinder cycles shown so that fuel adjustments and effects of the fuel adjustments may be illustrated under similar conditions.

At the time between $T_0$ and $T_1$, the desired combustion phase of cylinder number one is toward the advanced range, and the actual combustion phase substantially matches the desired combustion phase. The fuel pressure is also at a higher level. The fuel injection pulses, although not shown, are as shown at the timings between times $T_1$ and $T_2$ and the fuel cetane number is a nominal cetane number.

At the time between $T_1$ and $T_2$, the desired combustion phase remains at the same level as is shown at time $T_0$. Three fuel injections 550-554 are injected during the compression stroke of cylinder number one. The amount of fuel in each of the three fuel injections 550-554 is substantially equivalent. The duration of the fuel injection time is denoted at 502. The fuel pressure is also at a relatively higher value. Combustion occurs delayed after the third fuel pulse 554 as indicated by the *. The actual combustion phase is retarded as compared to the actual combustion phase before time $T_1$. In this example, the combustion phase is also retarded due to a cetane number of a combusted fuel changing from time $T_0$ to time $T_1$. Thus, the decreased cetane number of the fuel retards the actual combustion phase away from the desired combustion phase.

Between time $T_2$ and $T_3$, the fuel injection timing is adjusted and the fuel injection pressure is decreased. Specifically, a portion of the amount of fuel in the late or third fuel pulse 554 is transferred to the early or first fuel pulse 550. Further, the late fuel injection time may be retarded in some examples. Again, removing an amount of fuel from the late injection and adding the same amount of fuel that was removed from the late injection to the first injection can advance combustion in the cylinder even with for the fuel with the lower cetane number. Further, the amount of fuel injected in the duration 504 is the same as at the duration 502. The fuel injection pressure is also decreased since there is time to mix the fuel with the air in the cylinder. It can be seen that the actual combustion phase between time $T_2$ and time $T_3$ is retarded in response to the fuel pulse adjustment and moves toward the desired combustion phase.

Between time $T_3$ and $T_4$, the fuel injection timing is further adjusted and the fuel injection pressure is decreased. Specifically, the late fuel pulse width is eliminated after the late fuel pulse width reaches a minimum fuel injector pulse width. Fuel is transferred from the late fuel pulse 554 into the middle fuel pulse 552 and the early fuel pulse 550. Removing an amount of fuel from the late fuel injection 554 and adding the same amount of fuel that was removed from the late fuel injection 554 to the early middle fuel injection 552 also acts to advance combustion in the cylinder for the fuel with the lower cetane number. The end of injection time may also be advanced by eliminating the late fuel injection as shown at 510. The actual combustion phase and the * are shown being further advanced. The fuel injection pressure is also decreased. It can be seen that the combustion phase between time $T_3$ and time $T_4$ is further advanced in response to the fuel pulse adjustment.

After time $T_4$, the fuel injection timing is further adjusted and the fuel injection pressure is decreased. Specifically, the early fuel pulse expanded with by adding fuel to it from the middle fuel pulse 552. The actual combustion phase and the * are shown being further advanced. The end of injection is also further advanced as shown at 512. If additional combustion phase advance is desirable to match the actual combustion phase to the desired combustion phase, fuel in the middle fuel pulse 552 can be transferred to the early fuel pulse 550. All fuel remaining in the middle fuel pulse 552 may be transferred to the early fuel pulse 550 when the middle fuel pulse 552 reaches a minimum fuel injector pulse width and additional combustion phase advance is desired. The amount of fuel injected in the duration 508 is the same as at the duration 502.

In this way, fuel amounts between a plurality of fuel injections provided to a cylinder during a cylinder cycle may be adjusted over a number of combustion events to advance combustion phase of a cylinder when combustion phase of the cylinder is retarded farther than is desired. Further, the end of injection time is advanced for late and middle fuel injections. Additionally, fuel injection pressure may be decreased to improve engine efficiency.

Figure 6:
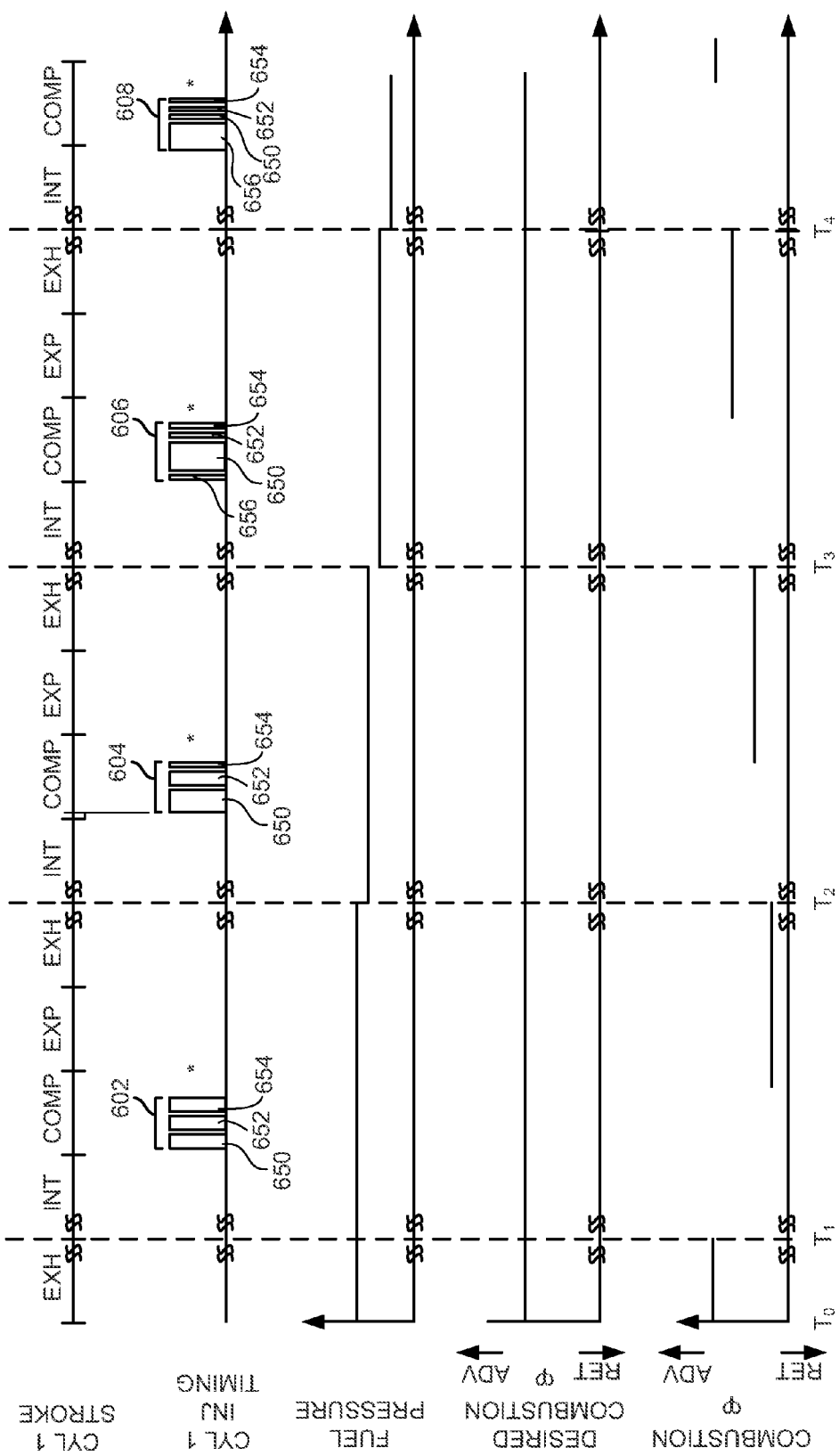

Referring now to FIG. 6, signals of interest during a time when combustion phase of a cylinder is retarded and is then advanced are shown. The signals and sequences of FIG. 6 may be provided by the system shown in FIG. 1 executing the method of FIGS. 7 and 8. An engine is operated at substantially the same speed and torque demand for all cylinder cycles shown so that fuel adjustments and effects of the fuel adjustments may be illustrated under similar conditions.

At the time between $T_0$ and $T_1$, the desired combustion phase of cylinder number one is toward the advanced range, and the actual combustion phase substantially matches the desired combustion phase. The fuel pressure is also at a higher level. The fuel injection pulses, although not shown, are as shown at the timings between times $T_1$ and $T_2$ and the fuel cetane number is a nominal cetane number.

At the time between $T_1$ and $T_2$, the desired combustion phase remains at the same level as is shown at time $T_0$. Three fuel injections 650-654 are injected during the compression stroke of cylinder number one. The amount of fuel in each of the three fuel injections 650-654 is substantially equivalent. The duration of the fuel injection time is denoted at 602. The fuel pressure is also at a relatively higher value. Combustion occurs delayed after the third fuel pulse 654 as indicated by the *. The actual combustion phase is retarded as compared to the actual combustion phase before time $T_1$. In this example, the combustion phase is also retarded due to a cetane number of a combusted fuel changing from time $T_0$ to time $T_1$. Thus, the decreased cetane number of the fuel retards the actual combustion phase away from the desired combustion phase.

Between time $T_2$ and $T_3$, the fuel injection timing is adjusted and the fuel injection pressure is decreased. Specifically, a portion of the amount of fuel in the late or third fuel pulse 654 is transferred to the early or first fuel pulse 650. Further, the late fuel injection time may be retarded in some examples. Again, removing an amount of fuel from the late injection and adding the same amount of fuel that was removed from the late injection to the first injection 650 can advance combustion phase in the cylinder even with for the fuel with the lower cetane number. Further, the amount of fuel injected in the duration 604 is the same as at the duration 602. The fuel injection pressure is also decreased since there is time to mix the fuel with the air in the cylinder. It can be seen that the actual combustion phase between time $T_2$ and time $T_3$ is advanced in response to the fuel pulse adjustment and moves toward the desired combustion phase.

Between time $T_3$ and $T_4$, the fuel injection timing is further adjusted and the fuel injection pressure is decreased. Specifically, a portion of the middle fuel pulse 652 is transferred to a new fuel pulse 656 advanced of early fuel pulse 650. Thus, the number of fuel pulses increases in response to the fuel cetane number. Removing an amount of fuel from the middle fuel pulse 652 and adding the same amount of fuel that was removed from the middle fuel injection 652 to the new fuel injection 656 also acts to advance combustion in the cylinder for the fuel with the lower cetane number. The fuel injection pressure is also decreased.

After time $T_4$, the fuel injection timing is further adjusted and the fuel injection pressure is decreased. Specifically, the fuel in the middle fuel pulse 652 reaches a minimum pulse width and then fuel from the original early fuel pulse 650 is transferred to the new fuel pulse 656. If further combustion phase advance is desired, fuel from the middle fuel pulse 652 can be added to fuel pulse 656 and the middle fuel pulse 652 can be dropped. When the middle fuel pulse 652 is dropped, the late fuel pulse 654 is maintained so as to maintain ignition dwell time (e.g., the amount of time from the latest fuel pulse to when ignition occurs). The actual combustion phase and the * are shown being further advanced. The amount of fuel injected in the duration 608 is the same as at the duration 602, 604, and 606.

In this way, fuel amounts between a plurality of fuel injections provided to a cylinder during a cylinder cycle may be adjusted over a number of combustion events to advance combustion phase of a cylinder when combustion phase of the cylinder is retarded farther than is desired. Additionally, fuel injection pressure may be decreased to improve engine efficiency.

Figure 7:
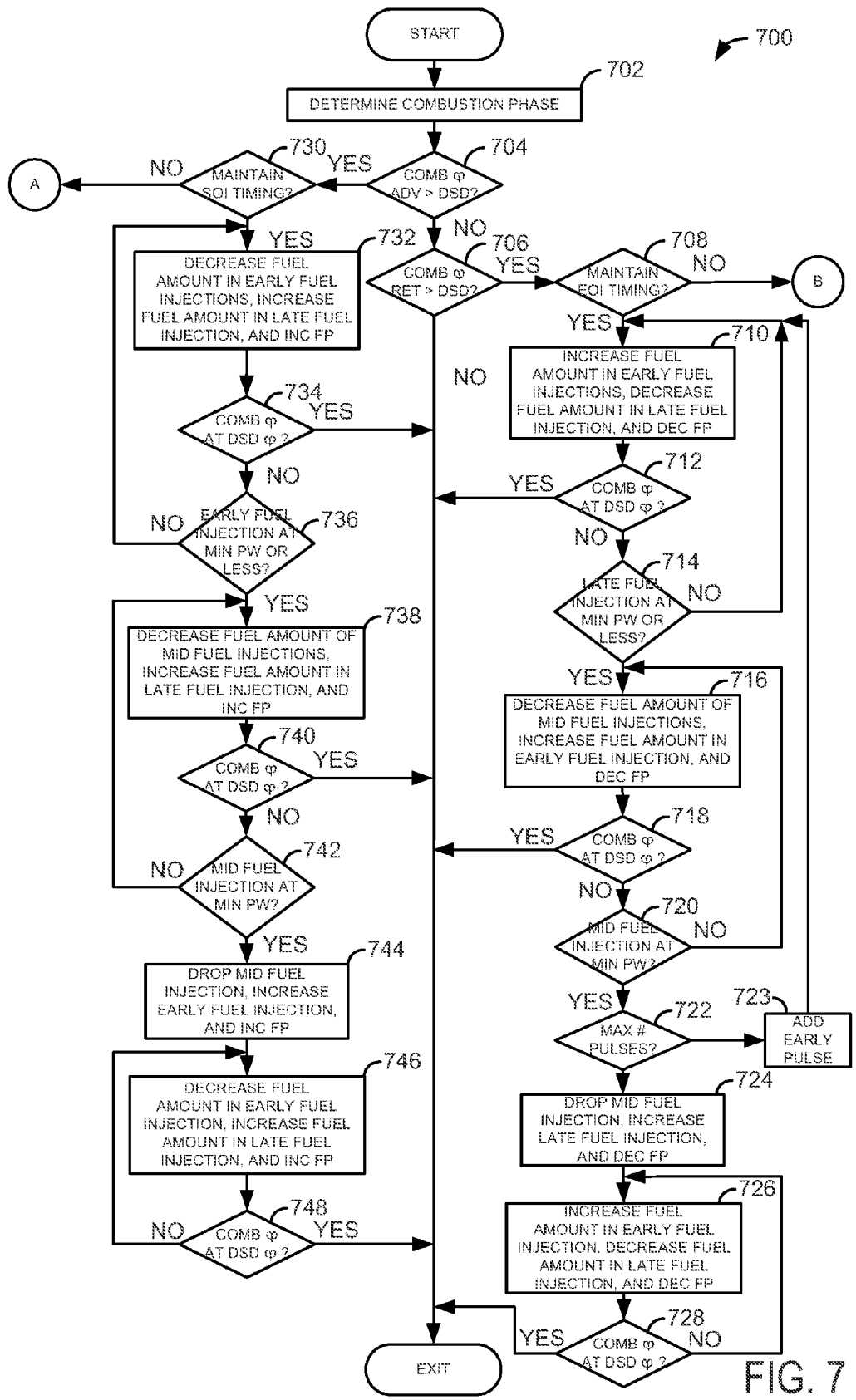
FIGS. 7-8 show a flowchart of an example method for controlling fuel injection to compensate for fuels having different cetane numbers.
Figure 8:
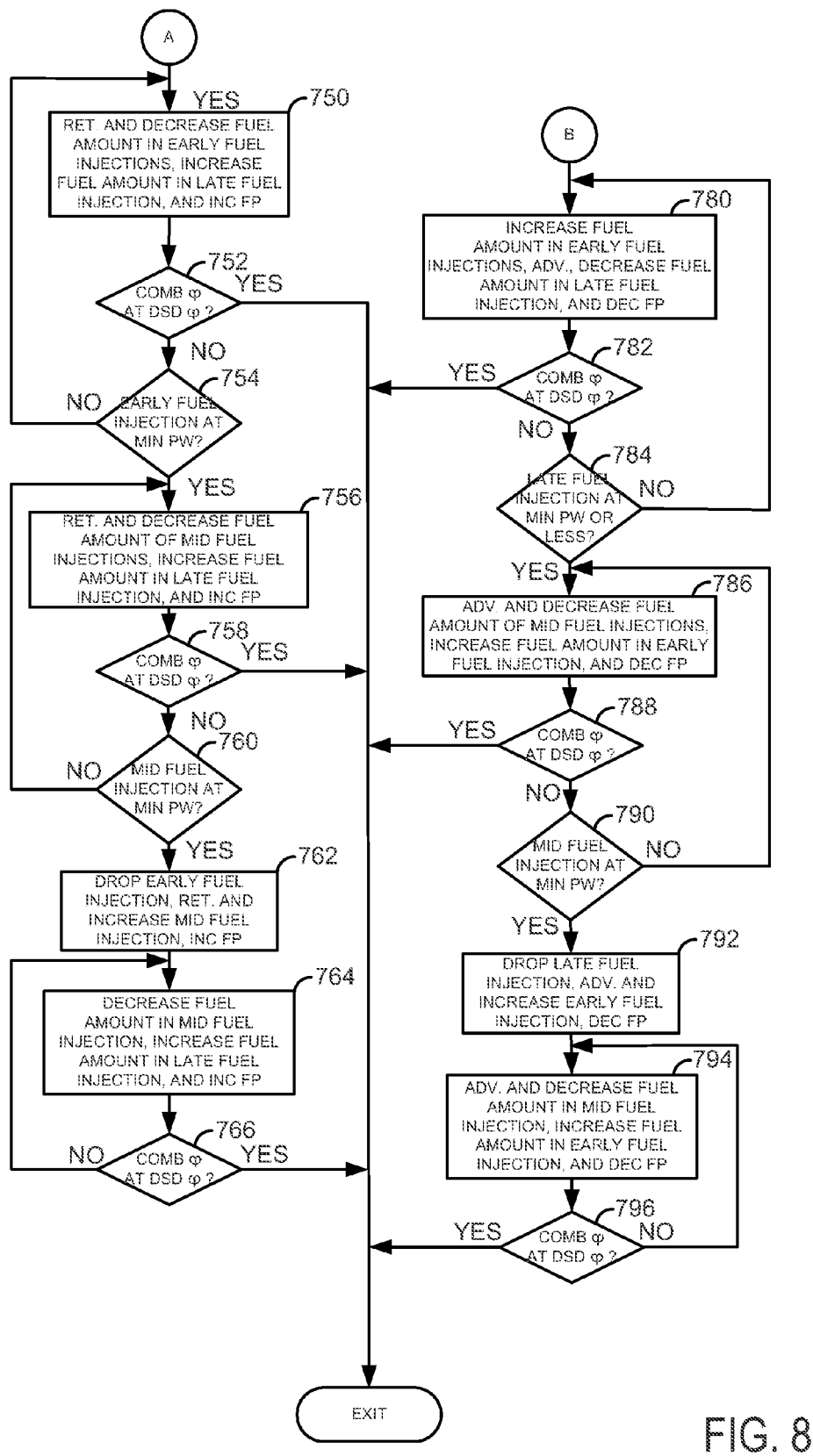

Referring now to FIGS. 7 and 8, a method for compensating for combusting fuel having a higher or lower cetane number than a nominal cetane number is shown. The method of FIGS. 7 and 8 is executable in a system such as shown in FIG. 1 via computer readable instructions.

At 702, method 700 determines operating conditions including combustion phase. Combustion phase may be determined via pressure sensors in engine cylinders, accelerometer output, or from crankshaft position. Other operating conditions may include but are not limited to ambient temperature, engine temperature, engine torque demand, and engine speed. Method 700 proceeds to 704 after combustion phase is determined.

At 704, method 700 judges whether or not actual combustion phase is advanced from the desired combustion phase. In one example, the actual combustion phase is subtracted from the desired combustion phase to determine if the actual combustion phase is advanced more than a threshold amount from the desired combustion phase. For example, if actual combustion phase is 20 crankshaft degrees advanced from top-dead-center compression stroke of a cylinder and the desired combustion phases is 15 crankshaft degrees advanced from top-dead-center compression stroke while the threshold is 2 crankshaft degrees, method 700 proceeds to 730. If actual combustion phase is advanced by more than a threshold amount from the desired combustion phase, method 700 proceeds to 730. Otherwise, method 700 proceeds to 706.

At 706, method 700 judges whether or not actual combustion phase is retarded from the desired combustion phase. In one example, the actual combustion phase is subtracted from the desired combustion phase to determine if the actual combustion phase is retarded more than a threshold amount from the desired combustion phase. For example, if actual combustion phase is 5 crankshaft degrees advanced from top-dead-center compression stroke of a cylinder and the desired combustion phases is 15 crankshaft degrees advanced from top-dead-center compression stroke while the threshold is 2 crankshaft degrees, method 700 proceeds to 708. If actual combustion phase is retarded by more than a threshold amount from the desired combustion phase, method 700 proceeds to 708. Otherwise, method 700 proceeds to exit.

At 708, method 700 judges whether or not to maintain end of fuel injection timing (EOI). In one example, EOI timing may be based on engine speed and load. If engine speed and load are in a predetermined region, EOI is maintained as shown in FIG. 4 and method 700 proceeds to 710. Otherwise, method 700 proceeds to 780.

At 710, method 700 increases fuel in an early fuel injection event where fuel is injected multiple times in a cylinder cycle. A fuel amount in a late fuel injection is reduced by an amount that fuel is added to the early fuel injection. The pressure at which fuel is injected is also decreased. Fuel is added to the early fuel pulse and subtracted from the late fuel pulse via increasing and decreasing the fuel pulse widths. The fuel pressure may be decreased via adjusting a voltage supplied to a fuel pump or via adjusting a valve that controls fuel flow to a fuel injection pump. Method 700 proceeds to 712 after fuel pulses supplied to a cylinder during a cycle of a cylinder are adjusted to advance combustion phase of the cylinder.

At, 712 method 700 judges whether or not the actual combustion phase is at or within a predetermined range of the desired combustion phase. If so, method 700 proceeds to exit. If not, method 700 proceeds to 714.

At 714, method 700 judges whether or not the late fuel injection pulse of a plurality of fuel injections provided to a cylinder is at a minimum pulse width. The fuel pulse width may be compared to a minimum fuel pulse width amount stored in memory. The minimum fuel pulse width may vary with fuel pressure. Thus, the duration of fuel injection that constitute minimum fuel pulse width may vary with operating conditions. If the late fuel injection pulse width is at the minimum fuel pulse width, method 700 proceeds to 716. Otherwise, method 700 returns to 710 where the pulses of fuel supplied to a cylinder are adjusted again.

At 716, method 700 decreases a fuel amount of a middle fuel injection and increases an amount of fuel injected in an early fuel pulse. The amount of fuel removed from the middle fuel pulse is delivered in the early fuel pulse. The pressure of fuel delivered to the cylinder is further reduced as shown in FIG. 4, for example. Method 700 proceeds to 718 after fuel pulse widths are adjusted.

At 718, it is judged whether or not the actual combustion phase of the cylinder is at the desired combustion phase. If so, method 700 proceeds to exit. Otherwise, method 700 proceeds to 720.

At 720, method 700 judges whether or not the middle fuel pulse is at a minimum fuel pulse width. If so, method 700 proceeds to 722. Otherwise, method 700 returns to 716 where additional fuel can be removed from the middle fuel pulse width.

At 722, method 700 judges whether or not a maximum number of fuel pulses during a cylinder cycle has been reached. The maximum number of fuel pulses may depend on fuel injection pressure and injector response as well as engine speed. In one example, the maximum number of fuel injections during a cylinder cycle may be empirically determined and stored in a table that is indexed via engine speed. If method 700 determines that a maximum number of injections during a cylinder cycle is reached, method 700 proceeds to 724. Otherwise, method 700 proceeds to 723.

At 723, method 700 adds an additional fuel pulse to the number of fuel injections during a cylinder cycle. When a fuel injection is added, fuel is removed from the latest fuel pulse in the cylinder cycle that is not at a minimum fuel pulse and added to the new fuel pulse. Method 700 returns to 710 where fuel is added to the new fuel pulse from the latest fuel pulse that is not at a minimum fuel pulse width.

At 724, method 700 eliminates or drops the middle fuel pulse width. The amount of fuel removed from the middle fuel pulse is added to the early fuel pulse width. In this way, torque provided by the engine can remain substantially constant. The pressure of fuel supplied to the fuel injectors is also decreased. Method 700 proceeds to 726 after the middle fuel pulse is eliminated.

At 726, method 700 increases the amount of fuel delivered in the early fuel pulse and decreases the amount of fuel delivered in the late fuel pulse. The pressure of fuel supplied to the cylinder is also reduced. Method 700 proceeds to 728 after fuel amounts in the fuel pulses are adjusted.

At 728, method 700 judges whether or not the combustion phase of the cylinder is at the desired combustion phase. If so, method 700 proceeds to exit. It not, method 700 returns to 726 and additional fuel is added to the early fuel pulse from the late fuel pulse. Note that at 710, 716, 722, and 724 the EOI of the late fuel pulse width is maintained.

In this way, combustion phase of the cylinder can be advanced in response to a cetane number of a fuel being combusted. Further, the EOI timing may be maintained.

Returning now to the method of FIGS. 7 and 8, method 700 increases an amount of fuel supplied to the cylinder via an early fuel pulse of a plurality of fuel pulses delivered to a cylinder during a cycle of the cylinder at 780. Method 700 adjusts fuel in fuel pulses as described in FIG. 5. The fuel in the late fuel pulse is advanced and reduced. The amount of the late fuel pulse is reduced by the amount of fuel added to the early fuel pulse. The pressure of fuel supplied to the fuel injector is also decremented and reduced at 780. Method 700 proceeds to 782 after fuel pulses are adjusted.

At 782, method 700 judges whether or not the actual combustion phase is at the desired combustion phase. If so, method 700 proceeds to exit. Otherwise, method 700 proceeds to 784.

At 784, method 700 judges whether or not the late fuel injection pulse is at a minimum pulse width. If so, method 700 proceeds to 786. Otherwise, method 700 returns to 780 where additional fuel is added to the early fuel pulse and removed from the late fuel pulse.

At 786, method 700 advances and decreases fuel in the middle pulse of the plurality of fuel pulses delivered to the cylinder during a combustion cycle of the cylinder. Further, the fuel reduction of the middle fuel pulse is added to the early fuel pulse and the pressure of fuel supplied to the fuel injector supplying the fuel is reduced. Method 700 proceeds to 788 after fuel in the plurality of injections supplied to a cylinder during a cycle of the cylinder is adjusted.

At 788, method 700 judges whether or not the actual combustion phase of the cylinder is at the desired combustion phase. If so, method 700 proceeds to exit. If not, method 700 proceeds to 790.

At 790, method 700 judges whether or not the middle fuel pulse is at a minimum fuel pulse. If so, method 700 proceeds to 792. If not, method 700 returns to 786 where further fuel is removed from the middle fuel pulse and the same amount of fuel is added to the early fuel pulse.

At 792, method 700 eliminates the late fuel pulse such that the middle fuel pulse is the last fuel pulse and is advanced to further advance combustion phase. The fuel amount of fuel remaining in the last fuel pulse is added to the early fuel pulse and the middle fuel pulse. In some examples as shown in FIG. 6, an additional fuel pulse may also be provided. Further, in some examples the early fuel pulse start of injection timing may be advanced. Thus, the EOI timing is advanced. Method 700 proceeds to 794 after the fuel pulses are adjusted. In some examples, the actual combustion phase may be compared to the desired combustion phase after the fuel pulse adjustments are made. If the actual combustion phase is at the desired combustion phase, method 700 exits. Otherwise, method 700 proceeds to 794.

At 794, method 700 advances the EOI timing of the middle fuel pulse and additional fuel is removed from the middle fuel pulse (e.g., now the late fuel pulse) and added to the early fuel pulse and/or the new fuel pulse occurring before the early fuel pulse. Further, the pressure of fuel supplied to the fuel injector is decreased. Method 700 proceeds to 796 after the fuel pulses are adjusted.

At 796, method 700 judges whether or not the actual combustion phase is at the desired combustion phase. If so, method 700 proceeds to exit. If not, method 700 returns to 794 where additional fuel is removed from the middle fuel pulse.

At 730, method 700 judges whether or not to maintain start of fuel injection timing (SOI). In one example, SOI timing may be based on engine speed and load. If engine speed and load are in a predetermined region, SOI is maintained as shown in FIG. 2 and method 700 proceeds to 732. Otherwise, method 700 proceeds to 750.

At 732, method 700 decreases fuel in an early fuel injection event where fuel is injected multiple times in a cylinder cycle. A fuel amount in a late fuel injection is increased by an amount that fuel is removed from the early fuel injection. The pressure at which fuel is injected is also increased. Fuel is removed from the early fuel pulse and added to the late fuel pulse via increasing and decreasing the fuel pulse widths. The fuel pressure may be increased via adjusting a voltage supplied to a fuel pump or via adjusting a valve that controls fuel flow to a fuel injection pump. Method 700 proceeds to 734 after fuel pulses supplied to a cylinder during a cycle of a cylinder are adjusted to reduce combustion phase of the cylinder.

At, 734 method 700 judges whether or not the actual combustion phase is at or within a predetermined range of the desired combustion phase. If so, method 700 proceeds to exit. If not, method 700 proceeds to 736.

At 736, method 700 judges whether or not the early fuel injection pulse of a plurality of fuel injections provided to a cylinder is at a minimum pulse width. The fuel pulse width may be compared to a minimum fuel pulse width amount stored in memory. If the early fuel injection pulse width is at the minimum fuel pulse width, method 700 proceeds to 738. Otherwise, method 700 returns to 732 where the pulses of fuel supplied to a cylinder are adjusted again.

At 738, method 700 decreases a fuel amount of a middle fuel injection and increases an amount of fuel injected in the late fuel pulse. The amount of fuel removed from the middle fuel pulse is delivered in the late fuel pulse. The pressure of fuel delivered to the cylinder is further increased as shown in FIG. 2, for example. Method 700 proceeds to 740 after fuel pulse widths are adjusted. At 740, it is judged whether or not the actual combustion phase of the cylinder is at the desired combustion phase. If so, method 700 proceeds to exit. Otherwise, method 700 proceeds to 742.

At 742, method 700 judges whether or not the middle fuel pulse is at a minimum fuel pulse width. If so, method 700 proceeds to 744. Otherwise, method 700 returns to 738 where additional fuel can be removed from the middle fuel pulse width.

At 744, method 700 eliminates or drops the middle fuel pulse width. The amount of fuel removed from the middle fuel pulse is added to the late fuel pulse width. In this way, torque provided by the engine can remain substantially constant. The pressure of fuel supplied to the fuel injectors is also increased. Method 700 proceeds to 746 after the middle fuel pulse is eliminated.

At 746, method 700 decreases the amount of fuel delivered in the early fuel pulse and increases the amount of fuel delivered in the late fuel pulse. The pressure of fuel supplied to the cylinder is also increased. Method 700 proceeds to 748 after fuel amounts in the fuel pulses are adjusted.

At 748, method 700 judges whether or not the combustion phase of the cylinder is at the desired combustion phase. If so, method 700 proceeds to exit. If not, method 700 returns to 746 and additional fuel is removed from the early fuel pulse and added to the late fuel pulse. Note that at 732, 738, 744, and 746 the SOI of the late fuel pulse width is maintained.

In this way, combustion phase of the cylinder can be retarded in response to a cetane number of a fuel being combusted. Further, the SOI timing may be maintained.

Returning now to the method of FIGS. 7 and 8, method 700 decreases an amount of fuel supplied to the cylinder via an early fuel pulse of a plurality of fuel pulses delivered to a cylinder during a cycle of the cylinder at 750. Method 700 adjusts fuel in fuel pulses as described in FIG. 3. The fuel in the early fuel pulse is retarded and reduced. The amount of the early fuel pulse is reduced by the amount of fuel added to the late fuel pulse. The pressure of fuel supplied to the fuel injector is also incremented and increased at 750. Method 700 proceeds to 752 after fuel pulses are adjusted.

At 752, method 700 judges whether or not the actual combustion phase is at the desired combustion phase. If so, method 700 proceeds to exit. Otherwise, method 700 proceeds to 754.

At 754, method 700 judges whether or not the early fuel injection pulse is at a minimum pulse width. If so, method 700 proceeds to 756. Otherwise, method 700 returns to 750 where additional fuel is added to the late fuel pulse and removed from the early fuel pulse.

At 756, method 700 retards and decreases fuel in the middle pulse of the plurality of fuel pulses delivered to the cylinder during a combustion cycle of the cylinder. Further, the fuel reduction of the middle fuel pulse is added to the late fuel pulse and the pressure of fuel supplied to the fuel injector supplying the fuel is increased. Method 700 proceeds to 758 after fuel in the plurality of injections supplied to a cylinder during a cycle of the cylinder is adjusted.

At 758, method 700 judges whether or not the actual combustion phase of the cylinder is at the desired combustion phase. If so, method 700 proceeds to exit. If not, method 700 proceeds to 760.

At 760, method 700 judges whether or not the middle fuel pulse is at a minimum fuel pulse. If so, method 700 proceeds to 762. If not, method 700 returns to 756 where further fuel is removed from the middle fuel pulse and the same amount of fuel is added to the late fuel pulse.

At 762, method 700 eliminates the early fuel pulse such that the middle fuel pulse is the first fuel pulse and is retarded to further retard combustion phase. The fuel amount of fuel remaining in the first fuel pulse is added to the late fuel pulse and the middle fuel pulse. Further, in some examples the early fuel pulse start of injection timing may be retarded. Thus, the SOI timing is retarded. Method 700 proceeds to 764 after the fuel pulses are adjusted. In some examples, the actual combustion phase may be compared to the desired combustion phase after the fuel pulse adjustments are made. If the actual combustion phase is at the desired combustion phase, method 700 exits. Otherwise, method 700 proceeds to 764.

At 764, method 700 retards the SOI timing of the middle fuel pulse and additional fuel is removed from the middle fuel pulse (e.g., now the early fuel pulse) and added to the late fuel pulse. Further, the pressure of fuel supplied to the fuel injector is increased. Method 700 proceeds to 766 after the fuel pulses are adjusted.

At 766, method 700 judges whether or not the actual combustion phase is at the desired combustion phase. If so, method 700 proceeds exit. If not, method 700 returns to 744 where additional fuel is removed from the middle fuel pulse and added to the late fuel pulse.

Thus, the method of FIGS. 7 and 8 provides for a method for operating an engine, comprising: combusting a first fuel in a cylinder, the first fuel mixture ignited via compression ignition; combusting a second fuel in the cylinder, a combustion phase of the cylinder advanced when the first fuel is combusted compared to when the second fuel is combusted; and adjusting a number of fuel injections provided to the cylinder during a cycle of the cylinder in response to the combustion phase. In this way, the cylinder combustion phase change due to fuel cetane number may be compensated.

The method also includes where the first fuel has a first cetane number and where the second fuel has a second cetane number, the second cetane number different from the first cetane number. The method also includes where the number of fuel injections is increased in response to a retarded combustion phase. The method further comprises adjusting a pressure of fuel supplied to the engine in response to the combustion phase of the engine. The method also further comprises reducing a fuel amount of an early fuel injection event of a cylinder cycle and increasing a fuel amount of a late fuel injection event of the cylinder cycle in response to an advanced combustion phase. In some examples, the method further comprises increasing a fuel amount of an early fuel injection event of a cylinder cycle and decreasing a fuel amount of a late fuel injection event of the cylinder cycle in response to a retarded combustion phase. The method further comprises advancing timing of the late fuel injection event during the cycle of the cylinder in response to the retarded combustion phase.

The method of FIGS. 7 and 8 also provides for operating an engine, comprising: injecting fuel in at least two fuel injection events during a cycle of a cylinder; and adjusting fuel amounts between the at least two fuel injection events in response to a combustion phase of the engine. By moving fuel between fuel injection events combustion phase may be adjusted while engine noise is maintained at a lower level.

The method includes where injecting fuel in at least two fuel injection events comprises injecting fuel to the cylinder in three separate fuel pulses. The method also includes where adjusting fuel amounts between the at least two fuel injection events comprises reducing an early fuel injection event by a first fuel amount and adding the first fuel amount to a late fuel injection event. In some examples, the method includes where adjusting fuel amounts between the at least two fuel injection events comprises increasing an early fuel injection event by a first fuel amount and reducing a late fuel injection event by the first fuel amount. The method further comprises adjusting a number of fuel injections in the at least two fuel injection events in response to the combustion phase of the engine. The method also includes where adjusting the number of fuel injections comprises reducing the number of fuel injections from three fuel injections to two fuel injections. The method also includes where adjusting the number of fuel injections comprises increasing the number of fuel injections from three fuel injections to four fuel injections. The method also includes where adjusting fuel amounts between the at least two fuel injection events occurs over a plurality of cycles of the cylinder.

As will be appreciated by one of ordinary skill in the art, the method described in FIGS. 7 and 8 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating an engine, comprising:
    combusting a first fuel in a cylinder, the first fuel ignited via compression ignition;
    combusting a second fuel in the cylinder, a combustion phase of the cylinder adjusted when the second fuel is combusted compared to when the first fuel is combusted; and
    adjusting a number of fuel injections provided to the cylinder during a cycle of the cylinder in response to the combustion phase.

2. The method of claim 1, where the first fuel has a first cetane number and where the second fuel has a second cetane number, the second cetane number different from the first cetane number, and where the combustion phase is advanced when the number of fuel injections is increased.

3. The method of claim 1, where the number of fuel injections is increased in response to a retarded combustion phase, and where end of fuel injection time is maintained.

4. The method of claim 1, further comprising adjusting a pressure of fuel supplied to the engine in response to a combustion phase of the engine.

5. The method of claim 1, further comprising reducing a fuel amount of an early fuel injection event of a cylinder cycle and increasing a fuel amount of a late fuel injection event of the cylinder cycle in response to an advanced combustion phase.

6. The method of claim 1, further comprising increasing a fuel amount of an early fuel injection event of a cylinder cycle and decreasing a fuel amount of a late fuel injection event of the cylinder cycle in response to a retarded combustion phase.

7. The method of claim 6, further comprising advancing timing of the late fuel injection event during the cycle of the cylinder in response to the retarded combustion phase.

\* \* \* \* \*